United States Patent
Liu

(10) Patent No.: US 12,282,038 B2
(45) Date of Patent: Apr. 22, 2025

(54) SYNCHRONOUS MEASUREMENT SYSTEM FOR VELOCITY AND TEMPERATURE OF ENGINE PLUME FLOW FIELD

(71) Applicant: Qingdao Zhennuo Laser Technology Co., Ltd., Shandong (CN)

(72) Inventor: Xunchen Liu, Shanghai (CN)

(73) Assignee: QINGDAO ZHENNUO LASER TECHNOLOGY CO., LTD., Shandong (CN)

( * ) Notice: Subject to any disclaimer, the term of this patent is extended or adjusted under 35 U.S.C. 154(b) by 291 days.

(21) Appl. No.: 18/174,987

(22) Filed: Feb. 27, 2023

(65) Prior Publication Data

US 2023/0280365 A1  Sep. 7, 2023

(30) Foreign Application Priority Data

Mar. 1, 2022 (CN) .......................... 202210195344.7

(51) Int. Cl.
   *G01J 5/00* (2022.01)
   *G01P 5/00* (2006.01)

(52) U.S. Cl.
   CPC .................................. *G01P 5/001* (2013.01)

(58) Field of Classification Search
   CPC .. G01P 5/001; G01P 5/26; G01P 5/00; G01M 15/14; G01K 11/006
   See application file for complete search history.

(56) References Cited

U.S. PATENT DOCUMENTS 4,711,571 A * 12/1987 Schuman ............. G08B 17/117
                                                356/417
6,364,524 B1 * 4/2002 Markham ............. G01J 5/0022
                                                374/131

OTHER PUBLICATIONS

Shi et al., "A compact fiber-coupled NIR/MIR laser absorption instrument for the simultaneous measurement of gas-phase temperature and CO, CO2, and H2O concentration," Sensors, 22 pages. (Year: 2022).*

* cited by examiner

*Primary Examiner* — Kiho Kim
(74) *Attorney, Agent, or Firm* — Alston & Bird LLP

(57) ABSTRACT

A synchronous measurement system for a velocity and a temperature of an engine plume flow field is provided. The system includes multiple mid infrared lasers, a signal generator, two optical fiber amplifiers, two groups of optical fiber couplers, a photoelectric detector, a data acquisition device, and a host. The four mid infrared lasers are divided into two groups, one group is configured to emit two beams of first mid infrared lasers, and the other group to emit two beams of second mid infrared lasers. Each group of optical fiber couplers is arranged at an outlet of an engine through a mounting frame which are perpendicular to each other. The data acquisition device acquires photoelectric signals and processes them into corresponding spectral data. The host processes the spectral data to obtain the velocity and the temperature of the engine plume flow field.

13 Claims, 6 Drawing Sheets

SYNCHRONOUS MEASUREMENT SYSTEM FOR VELOCITY AND TEMPERATURE OF ENGINE PLUME FLOW FIELD

CROSS REFERENCE TO RELATED APPLICATIONS

This patent application claims the benefit and priority of Chinese Patent Application No. 202210195344.7, entitled "Synchronous Measurement System for Velocity and Temperature of Engine Plume Flow Field" filed on Mar. 1, 2022, the disclosure of which is incorporated by reference herein in its entirety as part of the present application.

BACKGROUND

Technical Field

The present disclosure relates to a technical field of an engine test measurement, and in particular to a synchronous measurement system for a velocity and a temperature of an engine plume flow field.

Description of Related Art

The parameter distributions of the component concentration and the temperature of hot-commissioning wake flame of a rocket engine are important indexes for evaluating thermal performance of the rocket engine, and can provide quantitative basis for combustion state analysis, optimizations of thermal protection and thermal control designs, and fault diagnosis of the rocket engine.

At present, the maximum temperature of an outlet of the rocket engine is 3200° C., and the temperature measurement mode during the test process mainly includes two modes such as a thermocouple mode and an infrared thermal imager mode. The thermocouple mode has limitations in terms of upper limit of the temperature, dynamic response and precision. With the increasing requirement of the upper limit of high-temperature measurement and the demand of non-interference test to a vacuum flow field, the research of a new mode measurement technology need to be developed. A thermal radiation temperature measurement method has a problem of low measurement precision when measuring a temperature of an engine throat position, where there is a measurement error of 20° C.-40° C. for a measurement range of 2000° C. Under the condition that the designed specific impulse of the engine reaches an ultimate working condition, an existing temperature measurement mode cannot meet a requirement of testing thermal control parameters.

In addition, a velocity field of the engine plume flow field is an important reference factor for determining the operation of the engine, and in order to better monitor a combustion process of the engine, a velocity of the engine plume flow field needs to be measured. Generally, a thermal state velocity can reach 3000 m/s, and common methods such as a hot-wire anemometer or particle tracing speed measurement are difficult to be applied to the engine plume flow field. That is, a total temperature cannot be measured as the velocity cannot be measured, and thus it is difficult to calculate a thermal state of the engine. Therefore, there is an urgent need for a system that can simultaneously measure the velocity and temperature of the engine plume flow field.

BRIEF SUMMARY

The present disclosure intends to provide a synchronous measurement system for a velocity and a temperature of an engine plume flow field, so as to solve the above-mentioned problems. The technical solutions provided by the present disclosure are as follows.

A synchronous measurement system for a velocity and a temperature of an engine plume flow field includes: four mid infrared lasers, a signal generator, two optical fiber amplifiers, two groups of optical fiber couplers, a photoelectric detector, a data acquisition device, and a host.

The four mid infrared lasers are divided into two groups, wherein each group has two mid infrared lasers, each group comprises two mid infrared lasers, one group is configured to emit two beams of first mid infrared lasers with different wavelengths respectively sensitive to high-temperature and low-temperature water molecules, and the other group is configured to emit two beams of second mid infrared lasers with different wavelengths and respectively sensitive to high-temperature and low-temperature carbon dioxide molecules.

The signal generator is configured to modulate, using a time division multiplexing technology, the two beams of first mid infrared lasers into a beam of high-frequency first mid infrared laser and the two beams of second mid infrared lasers into a beam of high-frequency second mid infrared laser.

The two optical fiber amplifiers are configured to respectively amplify power of the beam of high-frequency first mid infrared laser and the power of the beam of high-frequency second mid infrared laser to required powers, and then respectively divide the beam of high-frequency first mid infrared laser and the beam of high-frequency second mid infrared laser into two groups of multi-channel parallel lasers using an optical fiber welding method.

Each group of optical fiber couplers is arranged at an outlet of an engine through a mounting frame, and two mounting frames are perpendicular to each other, so that the two groups of multi-channel parallel lasers are perpendicular to each other, each group of optical fiber couplers includes a plurality of transmitting end optical fiber couplers, and a plurality of receiving end optical fiber couplers corresponding to the plurality of transmitting end optical fiber couplers one by one, and the transmitting end optical fiber couplers are connected with the optical fiber amplifiers through optical fibers.

The photoelectric detector is connected with the receiving end optical fiber couplers through an optical fiber.

The data acquisition device is electrically connected with the photoelectric detector and is configured to acquire, in real time, photoelectric signals after being absorbed by gaseous molecules in a rocket engine plume flow field and process the photoelectric signals into corresponding spectral data.

The host is configured to process the spectral data through built-in spectral processing software to synchronously obtain the velocity and the temperature of the engine plume flow field.

In an embodiment, the signal generator, the lasers, the optical fiber amplifiers, the photoelectric detector, the data acquisition device and the host are integrated into a control cabinet.

In an embodiment, the lasers are semiconductor lasers configured to emit a laser of 3 Mw, and the optical fiber amplifiers are erbium doped fiber amplifiers configured to amplify power of high-frequency mid infrared lasers to 1 W.

In an embodiment, the transmitting end optical fiber couplers and the receiving end optical fiber coupler are mounted on a same side of the mounting frame, and a reflecting mirror is mounted on a side of the mounting frame opposite the optical fiber couplers.

In an embodiment, included angles between the two mounting frames and a velocity direction of the plume flow field are 45 degrees and 135 degrees, respectively.

In an embodiment, the number of the transmitting end optical fiber couplers and the number of the receiving end optical fiber couplers in each group are both 16.

In an embodiment, the optical fibers are single-mode polarization-maintaining optical fibers.

In an embodiment, wavelengths of the two beams of first mid infrared lasers are 1392 nm and 1398 nm, respectively; and wavelengths of the two beams of second mid infrared lasers are 4.17 microns and 4.19 microns, respectively.

In an embodiment, frequencies of the high-frequency first mid infrared laser and the high-frequency second mid infrared laser are both 1 Mhz.

In an embodiment, the high-frequency infrared laser is infrared laser of 1 Mh.

In an embodiment, the photoelectric detector is an indium gallium arsenide (InGaSn) detector.

According to the present disclosure, two beams of infrared lasers with different wavelengths are modulated into a beam of high-frequency infrared laser, and then the beam of high-frequency infrared laser is amplified and divided into multi-channel lasers, thereby greatly improving the measurement precision. In addition, the velocity of the engine plume flow field can be measured by means of two groups of parallel lasers perpendicular to each other, thereby monitoring a combustion state of the rocket engine.

Figure 1:
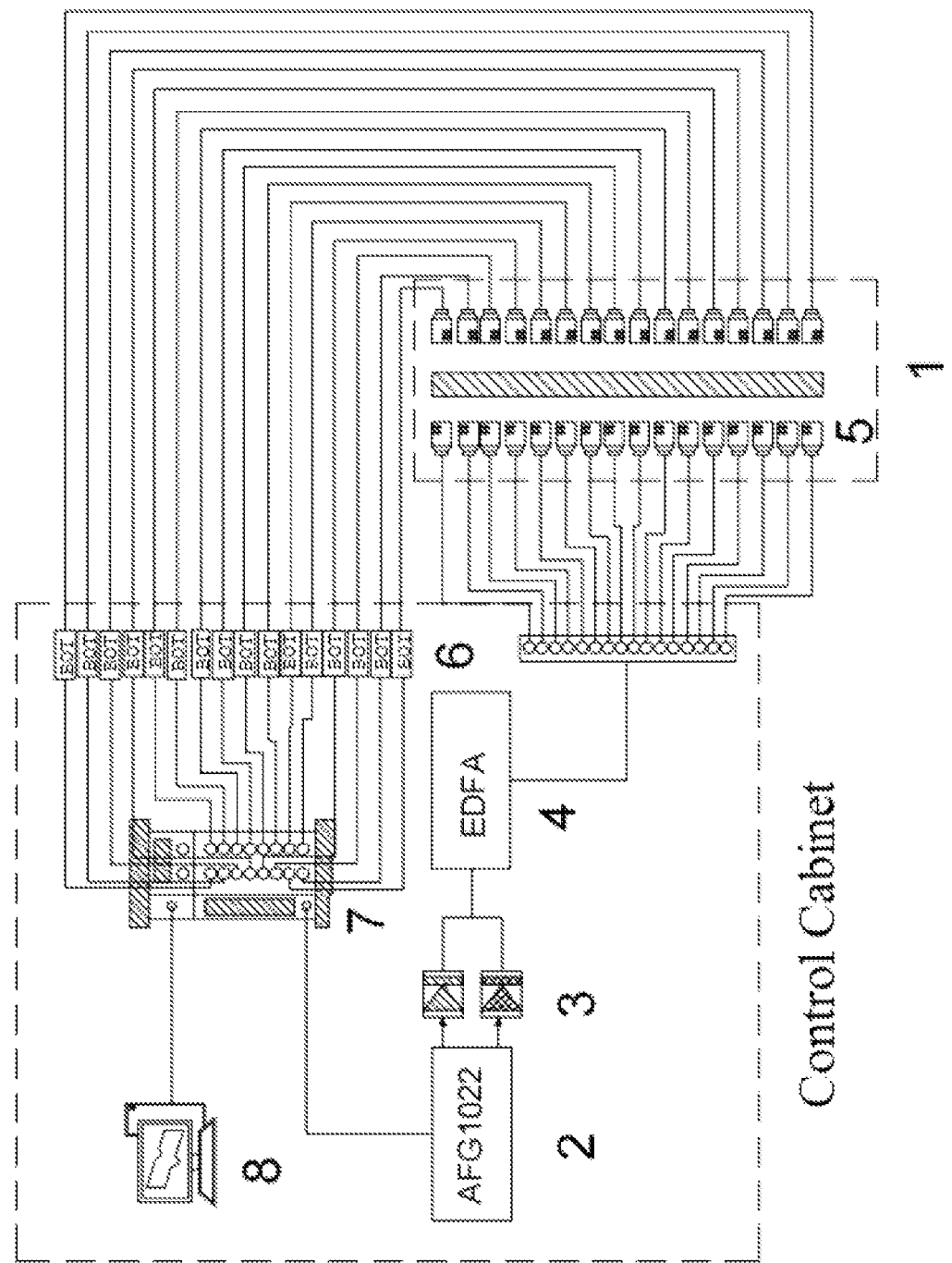
FIG. 1 is a schematic diagram of a synchronous measurement system for a velocity and a temperature of an engine plume flow field of the present disclosure.

Reference numerals: 1. vacuum chamber, 2. signal generator, 3. laser, 4. optical fiber amplifier, 5. optical fiber coupler, 6. photoelectric detector, 7. data acquisition device, 8. host, 9. mounting frame, and 10. reflecting mirror.

DETAILED DESCRIPTION OF VARIOUS EMBODIMENTS

Hereinafter, preferred embodiments of the present disclosure will be described in detail with reference to the accompanying drawings, so that the intentions, features and advantages of the present disclosure will be more clearly understood. It should be understood that the embodiments shown in the drawings are not intended to limit the scope of the present disclosure, but are merely intended to illustrate the essential spirit of the technical solutions of the present disclosure.

Figure 2:
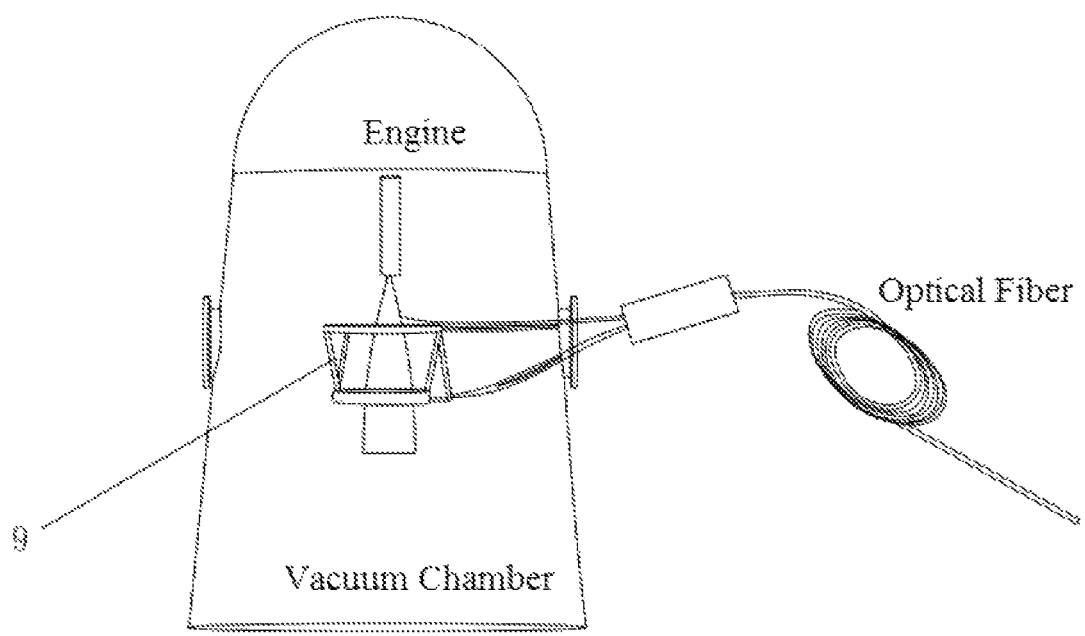
FIG. 2 is a mounting schematic diagram of optical fiber couplers of the synchronous measurement system for a velocity and a temperature of an engine plume flow field of the present disclosure.
Figure 3:
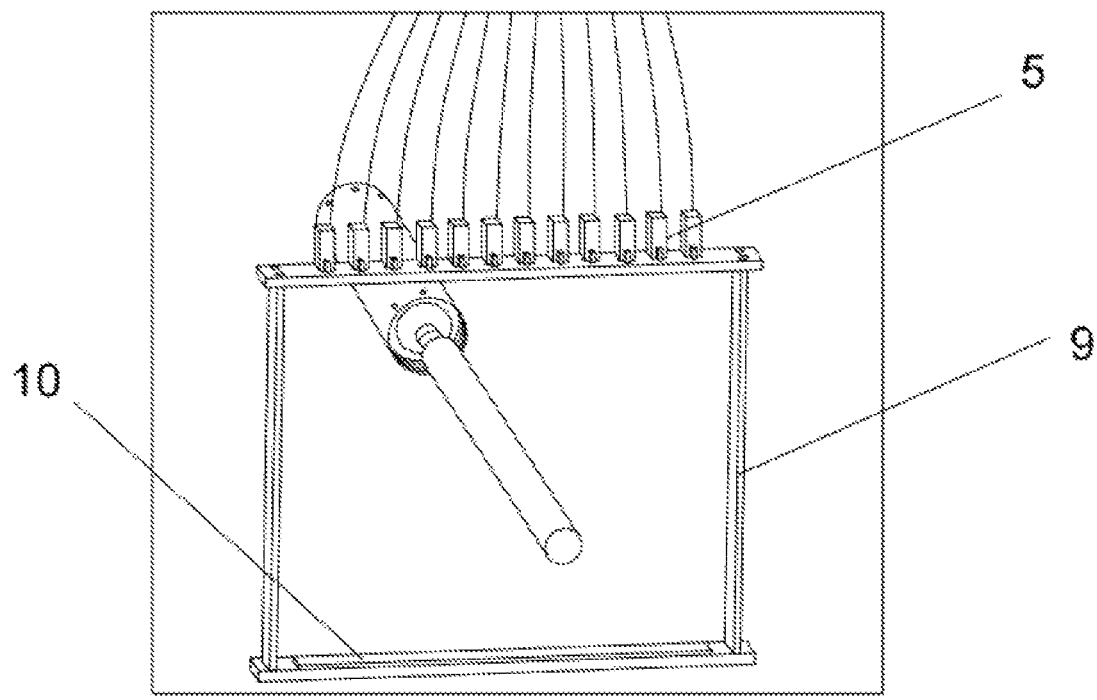
FIG. 3 is a partially mounting schematic diagram of one group of the optical fiber couplers shown in FIG. 2.

As shown in FIGS. 1-3, a synchronous measurement system for a velocity and a temperature of an engine plume flow field may include a vacuum chamber 1, a signal generator 2, four lasers 3, an optical fiber amplifier 4, an optical fiber coupler 5, a photoelectric detector 6, a data acquisition device 7, and a host 8. The vacuum chamber 1 is provided at an outlet of a rocket engine (i.e., in a plume flow field). Interference of ambient air to a measurement result can be avoided by arranging the vacuum chamber. It should be understood that the vacuum chamber 1 may be omitted in some cases. The signal generator 2, the laser 3, the optical fiber amplifier 4, the photoelectric detector 6, the data acquisition device 7 and the host 8 are positioned outside the vacuum chamber 1 and integrated in the control cabinet. The four mid infrared lasers 3 are divided into two groups, each including two lasers. One group is configured to emit two beams of first mid infrared lasers with different wavelengths (e.g., 1392 nm and 1398 nm) respectively sensitive to high-temperature and low-temperature water molecules, and the other group is configured to emit two beams of second mid infrared lasers with different wavelengths (e.g., 4.17 micrometers and 4.19 micrometers) respectively sensitive to high-temperature and low-temperature carbon dioxide molecules. The signal generator 2 generates a modulation signal of 1 MHz, and modulates the two beams of mid infrared lasers with different wavelengths (i.e., the first mid infrared lasers or the second mid infrared lasers) emitted by two lasers 3 into a beam of high-frequency mid infrared laser by using a time division multiplexing technology. In the present embodiment, the laser 3 adopts a semiconductor laser. That is, the present disclosure adopts a high-frequency tunable diode laser absorption spectrum (MHz-TDLAS) method, which can remove the influence of power frequency (<100 Hz) and turbulent fluctuation (<10 kHz) in a frequency domain, and improve the measurement accuracy. Since a light intensity emitted by the semiconductor laser is weak (for example, 3 Mw) and cannot meet a field test requirement, the light intensity is gained to an order of 1 W by the optical fiber amplifier 4, and a complicated test environment of the plume flow field in the vacuum chamber can be fully met. In one embodiment, the optical fiber amplifier 4 is an erbium doped fiber amplifier (EDFA).

By adopting an optical fiber welding method, the high-power infrared laser output by the optical fiber amplifier 4 is divided into 16 channels and then led into the vacuum chamber 1 from a control chamber through the optical fibers, to form 16 groups of measurement units, so as to improve the measurement precision. Each group of the measurement units includes two optical fiber couplers 5 which are end couplers respectively for laser emission and collection, namely a transmitting end optical fiber coupler and a receiving end optical fiber coupler. The transmitting end optical fiber coupler is connected with the optical fiber amplifier 4 through optical fibers; the receiving end optical fiber coupler is connected with the photoelectric detector 6 through optical fibers. It should be noted that the actual cable bend radius of the optical fibers involved in the devices is not less than the minimum bend radius specified by the optical fiber manufacturer. In one embodiment, the optical fibers adopt the single-mode polarization-maintaining optical fibers which can ensure that a linear polarization direction is unchanged, and improve a coherent signal-to-noise ratio, thereby realizing a high-precision measurement of the physical quantity. The optical fiber connector adopts an FC/APC connector.

The characteristic that the measured plume flow field at the outlet of the engine is centrosymmetric is considered, and a parallel light path measurement is adopted. A reflection light path method is adopted so as to improve an effective absorption distance, and thus two optical fiber couplers 5 in each group of measurement units are arranged on the same side of the outlet of the engine so as to facilitate measurement. By adjusting the mounting frame 9, a measurement angle is finely adjusted, such that the signal is optimized. On an opposite side of the optical fiber coupler 5, only one reflecting mirror 10 needs to be mounted for light reflection, which greatly facilitates the mounting and debugging process. It will be understood that the two optical fiber couplers 5 may also be mounted on opposite sides of the mounting frame 9, in which case the reflecting mirror 10 is not required. The two mounting frames 9 are perpendicular to each other so that two groups of multi-channel parallel lasers are perpendicular to each other to measure the velocity of the plume flow field. In one embodiment, an included angle between one mounting frame 9 and a velocity direction of the plume flow field is 45 degrees and an included angle between the other mounting frame 9 and a velocity direction of the plume flow field is 135 degrees.

The photoelectric detector 6 adopts an indium gallium arsenide (InGaSn) detector intensively arranged in a control cabinet of a control chamber, which adopts a unified battery for power supply to reduce measurement noise. The photoelectric detector 6 outputs 16 channels of amplified voltage signals, a data acquisition device 7 (such as a high-frequency data acquisition card) is used for measurement, the photoelectric signals after being absorbed by gaseous molecules in the rocket engine plume flow field are acquired in real time, and are processed into corresponding spectral data and then sent to the host 8. For example, modulation and denoising are carried out through a fast Fourier transform (FFT) combined with a low-pass filtering method. The host 8 processes the spectral data through built-in spectral processing software to obtain the temperature and the velocity of the rocket engine plume field. The analog-to-digital conversion frequency of the data acquisition device is 1 GS/s, and the precision is 16-bit vertical resolution. The data bus adopts internal link to ensure complete synchronization.

The temperature and velocity measurement program of the spectral processing software is designed based on the absorption spectroscopy measurement principle. The temperature measurement adopts a two-line temperature measurement method, and the principle of measuring the velocity based on the absorption spectrum utilizes a Doppler effect.

The two-line temperature measurement method is the most commonly used direct absorption spectrum technique, the principle of which is to calculate the temperature and concentration distribution of the absorption medium by integrating the absorbance obtained from the entire absorption line profile.

The absorbance $\tau$ can be defined as:

$\tau = P\int_0^L \chi(l) S(\nu,T) \phi \Delta \nu, T, p) dl.$

Since a linear function meets a normalization condition, it can be obtained that $\int_{-\infty}^{\infty} \phi(\nu) d\nu = 1$. The integral of the absorbance $A[cm^{-1}]$ can be written as:

$A = \int_{-\infty}^{\infty} \tau(\nu) d\nu = \int_0^L \chi(l) S(\nu,T) dl.$

Figure 4:
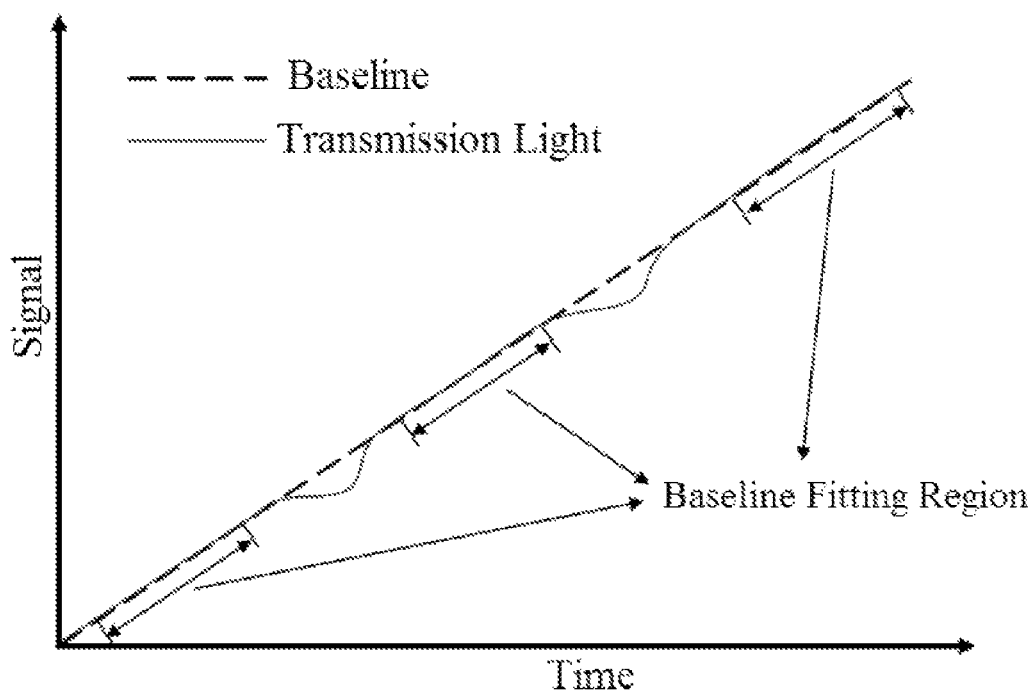
FIG. 4 is a schematic diagram of a two-line temperature measurement principle.
Figure 5A:
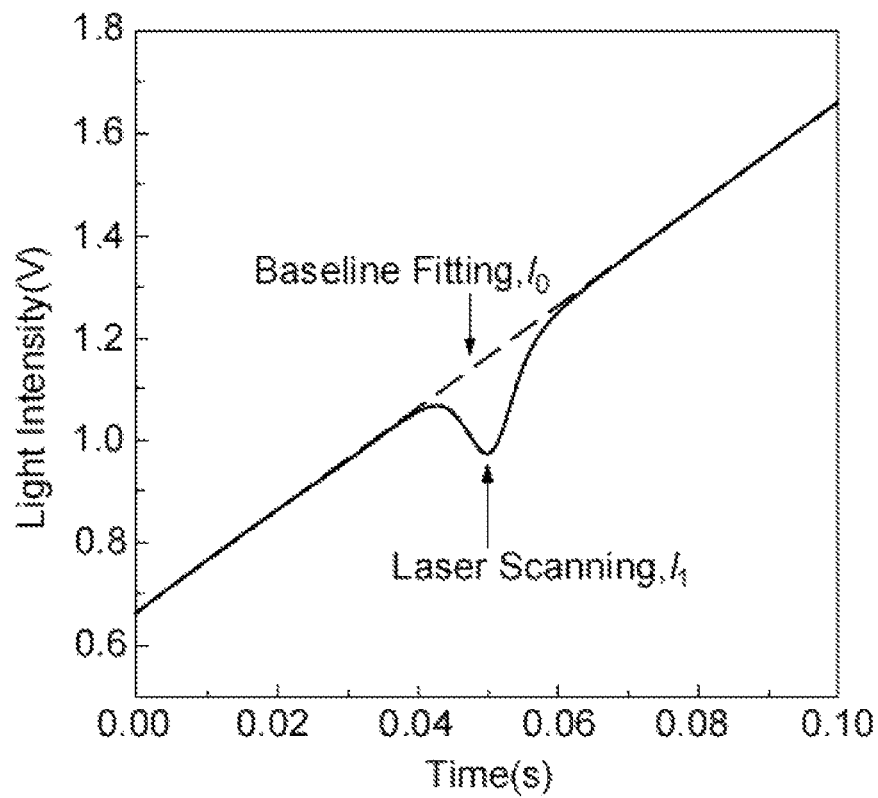
FIG. 5A is a first representative graph of absorbance.
Figure 5B:
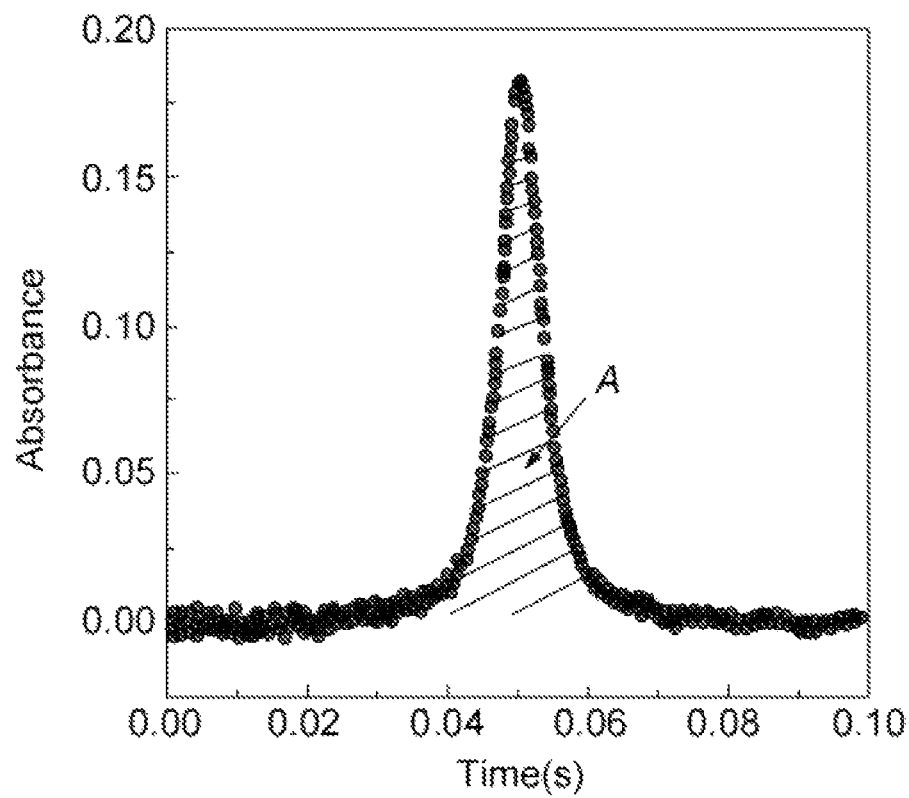
FIG. 5B is a second representative graph of absorbance.

FIG. 4 shows measurement signals of the two-line temperature measurement method. The function generator controls the laser to scan a saw-tooth or triangular waveform, a very pronounced absorption signal can be observed near the transition center. For near infrared laser, the absorption signals are often not pronounced, and thus the integrated absorbance information as shown in FIGS. 5A-5B can be obtained by calculating the absorbance and converting the time coordinate into the wavenumber coordinate.

If the absorption medium is homogeneous, i.e. the temperature and gas volume fraction in the laser path do not change, the ratio R of the integrated absorbances of the two absorption lines is only a function of the temperature:

$$R = \frac{A_1}{A_2} = \frac{\chi \cdot S_1(T) \cdot P \cdot L}{\chi \cdot S_2(T) \cdot P \cdot L} = \frac{S_1(T)}{S_2(T)} = \frac{S_1(T_0)}{S_2(T_0)} \exp\left(-\frac{hc(E_1'' - E_2'')}{k}\left(\frac{1}{T} - \frac{1}{T_0}\right)\right).$$

Therefore, the average temperature on the laser path can be found:

$$T = \frac{\frac{hc}{k}(E_2'' - E_1'')}{\ln\frac{A_1}{A_2} + \ln\frac{S_2(T_0)}{S_1(T_0)} + \frac{hc(E_2'' - E_1'')}{k} \frac{1}{T_0}}.$$

Wherein, $T_0$ is a reference temperature, $A_1$ and $A_2$ are respectively integrated absorbances of two absorption spectral lines, $E_1$ and $E_2$ are respectively the low-level energies of the two absorption spectral lines, c is the velocity of light, L is laser absorption path length, h is a plank constant, $6.62607015 \times 10^{-34}$ J/s, and k is a Boltzmann constant, $1.380649 \times 10^{-23}$ J/K. After obtaining the temperature information, concentration information of the absorption medium can be determined through any absorption spectral line, that is:

$$\chi = \frac{A_i}{P \cdot S_i(T) \cdot L}.$$

When the spectral lines are selected by the two-line temperature measurement method, on one hand, the intensity of the spectral line needs to be considered as the resolution of measurement is reduced when the intensity of the spectral line is too small; on the other hand, the higher temperature sensitivity in the measured temperature range is considered, and thus the low-level energy selections of the two spectral lines needs be appropriate.

If there are multiple absorption transitions within a laser scan range and they are affected by overlap each other, the two-line temperature measurement method cannot be used to solve the temperature and gas concentration. In this case, if the absorption medium is uniform along the laser path, the absorbance $\tau$ can be written as:

$\tau = P\chi \Sigma_j S_j(T) \phi_j(T,p).$

Since the spectral line intensity S and the linear function $\phi$ are a function of the temperature T and pressure P, $\tau$ is also a function of temperature T, concentration $\chi$, and pressure P. The optimal solution of the temperature T, the concentration $\chi$ and the pressure P can be obtained as follows by fitting $\tau(T,\chi,P)$ with the absorption rate $\tilde{\tau}$ measured by the experiment through a least square method:

$\Sigma_{j=1}^{N}(\tilde{\tau} - \tau(T,\chi,P))^2 \to \min.$

Wherein is the laser absorbance from a model, r is the measured laser absorbance, and N is the number of measured data points.

Compared with the two-line temperature measurement method, the temperature and concentration results calculated by the multi-line temperature measurement method are more accurate as the multi-line temperature measurement method contains more transition information.

Figure 6:
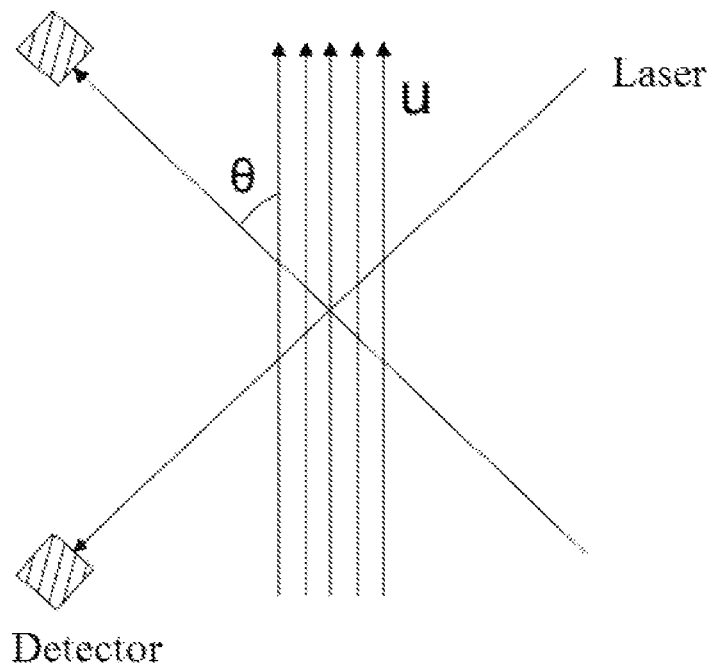
FIG. 6 is a schematic diagram of a principle of Doppler velocity-measuring with absorbed spectrum molecules.

The principle of measuring the velocity based on the absorption spectrum utilizes a Doppler effect, where the velocity of the molecule is calculated by measuring the shift in the spectral line position. According to the Doppler principle, the relative shift of the spectral line position is determined by the ratio of the projection of the molecular shift velocity on the absorption path to the velocity of light. Thus, when the absorption spectrum path is perpendicular to the flow field, the flow field movement has no component on the absorption path, and the thermal movement directions of the molecules are spatially uniform and thus cancel each other out. As shown in FIG. 6, when there is an included angle between the laser path and the flow field where the molecules are located, the molecule movement generates a certain component on the laser path. The laser spectrum measured by the detector produces Doppler shift, and the proportion of the shift frequency is proportional to the ratio of the molecular movement component to the velocity of light:

$$\frac{\Delta \bar{v}}{\bar{v}} = \frac{U \cdot \cos(\theta)}{c}.$$

Wherein $\Delta \bar{v}$ is a laser frequency shift, $\bar{v}$ is a laser center frequency, U is a velocity of a flow field, and $\theta$ is an angle between a laser beam and a flow velocity direction.

Figure 7:
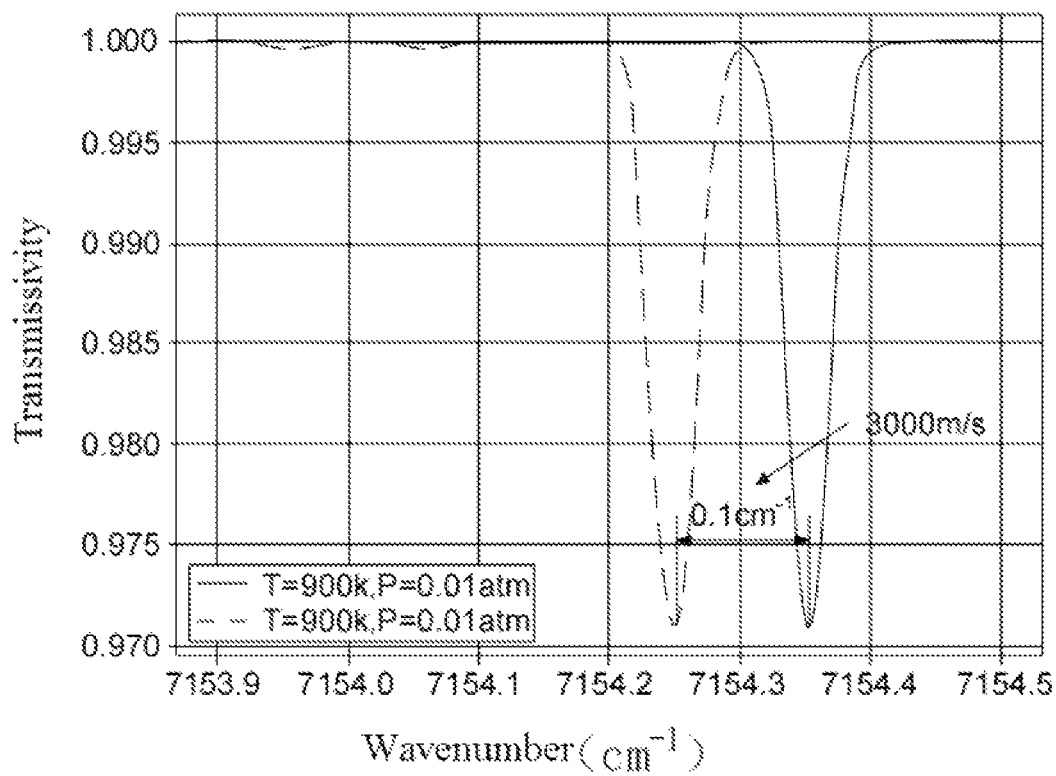
FIG. 7 is a Doppler shift plot of Doppler velocity-measuring with absorbed spectrum molecules.

As shown in FIG. 7, at a velocity of 3000 m/s, the relative shift of the near infrared absorption peak can be up to 0.1 cm$^{-1}$, which can produce a very pronounced Doppler shift signal. In general TDLAS infrared spectrum measurement, because the velocity of a flow field generally does not exceed subsonic velocity, the Doppler shift signal is very small, but in the vacuum chamber measurement, a velocity field of a high-velocity movement plume flow field is suitable to be measured by a Tunable Diode Laser Absorption Spectrum (TDLAS) velocity measurement method.

Considering that the absolute shifts of the spectral line positions are generally difficult to be measured accurately, two lasers perpendicular to each other are generally adopted, which are at an angle of 45 degrees and an angle of 135 degrees with respect to the measured flow velocity respectively, and the spectral line shift can be measured accurately by measuring the difference of the spectral line positions measured by the two lasers:

$$\frac{\Delta \bar{v}_{diff}/2}{\bar{v}} = \frac{U \cdot \sin(\pi/4)}{c}.$$

Wherein $\Delta \bar{v}_{diff}$ is a laser frequency drift.

Figure 8:
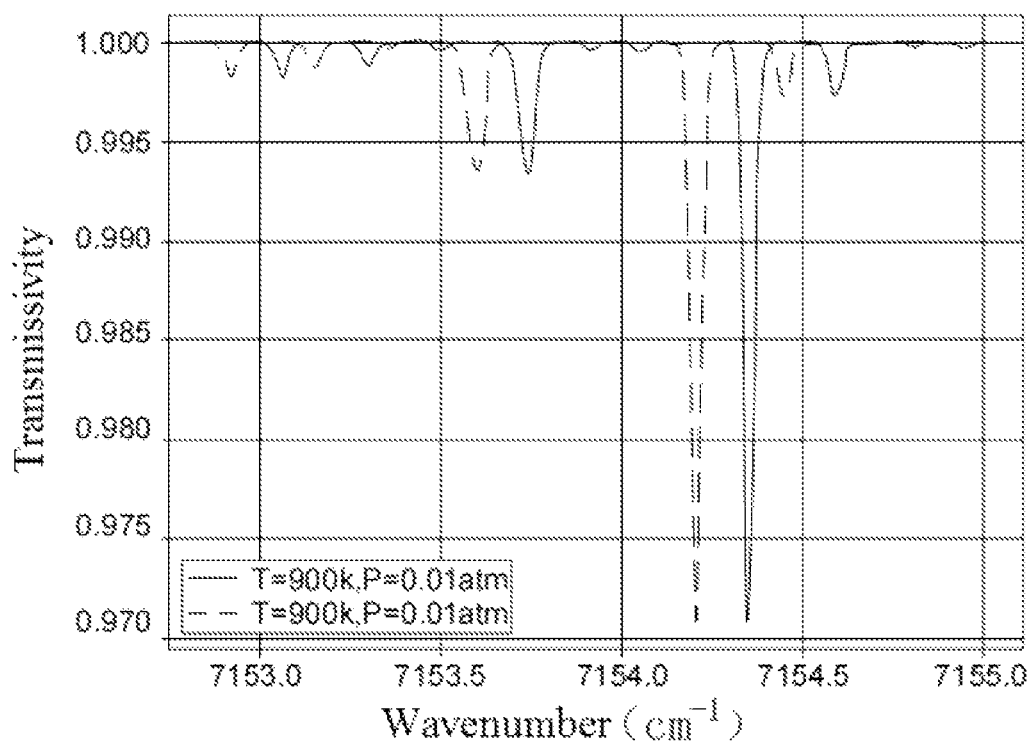
FIG. 8 is a Doppler shift plot of an absorption spectrum of water molecules when the temperature is 900K and the pressure is 1 kPa for two-line simultaneous measurements.
Figure 9:
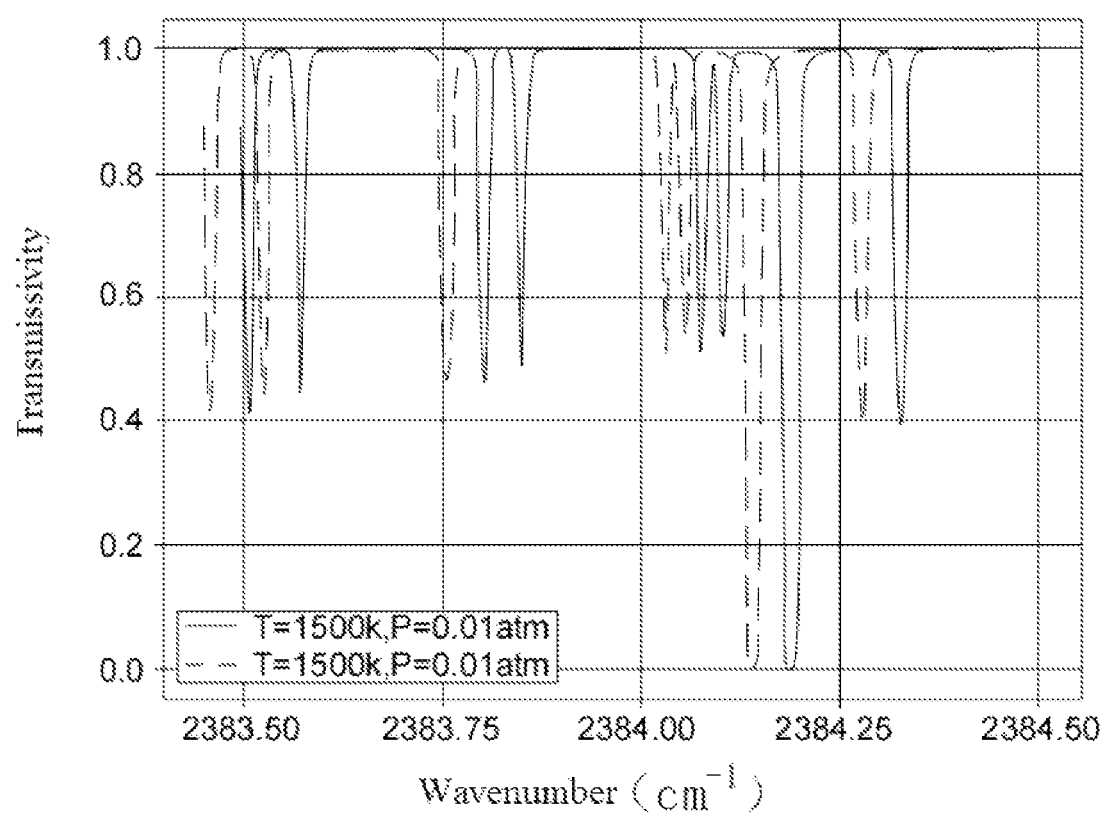
FIG. 9 is a Doppler shift plot of an absorption spectrum of carbon dioxide molecules when the temperature is 1500K and the pressure is 1 kPa for two-line simultaneous measurements.

FIG. 8 shows absorption peak movements generated by the Doppler effect at 900 k and 1000 Pa using a laser of 1.4 μm (e.g., 1392 nm and 1398 nm) for measuring the water molecules, and it can be seen that the absorption peak shift distance is relatively large. By adopting 16-channel optical path synchronous measurement, the high-frequency two-dimensional measurement can be carried out on the plume flow velocity field, thereby solving key problems in engine research. FIG. 9 shows the Doppler shift at 1500 k and pressure of 1000 pa for the measurement of carbon dioxide molecules using a laser of 4 micron (e.g., 4.17 micron and 4.19 micron). It can be seen that at a typical velocity (3000 m/s) of the engine outlet, the Doppler shift of the molecular absorption peak is up to 0.05 cm$^{-1}$, which is very suitable for engine outlet velocity measurement.

Furthermore, reflection measurement is adopted, the laser and the hot fluid generate opposite Doppler shifts, and the spectrum recorded by the detector is simultaneously split into absorption peaks in two directions. By adopting the method, the asynchronous sampling of two laser detection paths can be further solved, thereby further improving the measurement precision.

The beneficial effects of the present disclosure are as follows:
1. obtaining a static temperature of fuel gas through an intensity ratio of the absorption spectrum spectral line;
2. obtaining a dynamic temperature of the fuel gas through Doppler shift velocity measurement of the absorption spectrum spectral line;
3. obtaining velocity kinetic energy and molecular internal energy of the fuel gas of the engine, namely total temperature, by measuring the temperature and velocity simultaneously; and
4. isolating interference of visible light from the environment by selecting a wavelength with 1.8-2 um wave band and focusing the laser by adopting a silicon lens; and avoiding the generation of signals by mid infrared light in the environment and only responding to the signals in the laser wavelength range by using an indium gallium arsenide detector.

The preferred embodiments of the present disclosure have been described in detail above, but it should be understood that various changes or modifications to the present disclosure can be made by those skilled in the art after reading the above contents of the present disclosure. Such equivalents are intended to fall within the scope of the claims appended hereto.

What is claimed is:

1. A synchronous measurement system for a velocity and a temperature of an engine plume flow field, comprising:
    four mid infrared lasers divided into two groups, wherein each group has two mid infrared lasers, one group is configured to emit two beams of first mid infrared lasers with different wavelengths respectively sensitive to high-temperature and low-temperature water molecules, and an other group is configured to emit two beams of second mid infrared lasers with different wavelengths and respectively sensitive to high-temperature and low-temperature carbon dioxide molecules;
    a signal generator configured to modulate, using a time division multiplexing technology, the two beams of first mid infrared lasers into a beam of high-frequency first mid infrared laser and the two beams of second mid infrared lasers into a beam of high-frequency second mid infrared laser;
    two optical fiber amplifiers configured to respectively amplify power of the beam of high-frequency first mid infrared laser and the power of the beam of high-frequency second mid infrared laser to required powers, and then respectively divide the beam of high-frequency first mid infrared laser and the beam of high-frequency second mid infrared laser into two groups of multi-channel parallel lasers;

two groups of optical fiber couplers, wherein each group of optical fiber couplers is arranged at an outlet of an engine through a mounting frame, and two mounting frames are perpendicular to each other, so that the two groups of multi-channel parallel lasers are perpendicular to each other, each group of optical fiber couplers comprises a plurality of transmitting end optical fiber couplers, and a plurality of receiving end optical fiber couplers corresponding to the plurality of transmitting end optical fiber couplers one by one, and the transmitting end optical fiber couplers are connected with the optical fiber amplifiers through optical fibers;

a photoelectric detector connected with the receiving end optical fiber couplers through an optical fiber;

a data acquisition device electrically connected with the photoelectric detector and configured to acquire, in real time, photoelectric signals after being absorbed by gaseous molecules in a rocket engine plume flow field and process the photoelectric signals into corresponding spectral data; and a host configured to process the spectral data through built-in spectral processing software to synchronously obtain the velocity and the temperature of the engine plume flow field.

2. The synchronous measurement system for the velocity and the temperature of the engine plume flow field according to claim 1, wherein the signal generator, the lasers, the optical fiber amplifiers, the photoelectric detector, the data acquisition device and the host are integrated into a control cabinet.

3. The synchronous measurement system for the velocity and the temperature of the engine plume flow field according to claim 2, wherein the lasers are semiconductor lasers configured to emit a laser of 3 mW, and the optical fiber amplifiers are erbium doped fiber amplifiers to amplify power of high-frequency mid infrared lasers to 1 W.

4. The synchronous measurement system for the velocity and the temperature of the engine plume flow field according to claim 1, wherein the transmitting end optical fiber couplers and the receiving end optical fiber coupler are mounted on a same side of the mounting frame, and a reflecting mirror is mounted on a side of the mounting frame opposite the optical fiber couplers.

5. The synchronous measurement system for the velocity and the temperature of the engine plume flow field according to claim 4, wherein included angles between the two mounting frames and a velocity direction of the engine plume flow field are 45 degrees and 135 degrees, respectively.

6. The synchronous measurement system for the velocity and the temperature of the engine plume flow field according to claim 5, wherein the optical fibers are single-mode polarization-maintaining optical fibers.

7. The synchronous measurement system for the velocity and the temperature of the engine plume flow field according to claim 4, wherein a number of the transmitting end optical fiber couplers and a number of the receiving end optical fiber couplers in each group are both 16.

8. The synchronous measurement system for the velocity and the temperature of the engine plume flow field according to claim 1, wherein included angles between the two mounting frames and a velocity direction of the engine plume flow field are 45 degrees and 135 degrees, respectively.

9. The synchronous measurement system for the velocity and the temperature of the engine plume flow field according to claim 8, wherein the optical fibers are single-mode polarization-maintaining optical fibers.

10. The synchronous measurement system for the velocity and the temperature of the engine plume flow field according to claim 1, wherein a number of the transmitting end optical fiber couplers and a number of the receiving end optical fiber couplers in each group are both 16.

11. The synchronous measurement system for the velocity and the temperature of the engine plume flow field according to claim 1, wherein wavelengths of the two beams of first mid infrared lasers are 1392 nm and 1398 nm, respectively; and wavelengths of the two beams of second mid infrared lasers are 4.17 microns and 4.19 microns, respectively.

12. The synchronous measurement system for the velocity and the temperature of the engine plume flow field according to claim 1, wherein frequencies of the high-frequency first mid infrared laser and the high-frequency second mid infrared laser are both 1 Mhz.

13. The synchronous measurement system for the velocity and the temperature of the engine plume flow field according to claim 1, wherein the photoelectric detector is an indium gallium arsenide (InGaSn) detector.

* * * * *